United States Patent [19]

Shigemura

[11] Patent Number: 5,604,598
[45] Date of Patent: Feb. 18, 1997

[54] IMAGE PROCESSING APPARATUS

[75] Inventor: Yoshihiro Shigemura, Yokohama, Japan

[73] Assignee: Canon Kabushiki Kaisha, Tokyo, Japan

[21] Appl. No.: 262,571

[22] Filed: Jun. 20, 1994

[30] Foreign Application Priority Data

Jun. 22, 1993 [JP] Japan .................................. 5-150643

[51] Int. Cl.$^6$ .............................. H04N 1/21; H04N 1/00
[52] U.S. Cl. ........................................... 358/296; 358/401
[58] Field of Search .................................. 358/296, 524, 358/434–441, 401–408

[56] References Cited

U.S. PATENT DOCUMENTS

| 4,739,397 | 4/1988 | Hayashi | 358/80 |
| 4,743,962 | 5/1988 | McCormick | 358/78 |
| 5,084,770 | 1/1992 | Nakayama | 358/403 |
| 5,095,373 | 3/1992 | Hisano | 358/402 |
| 5,220,417 | 6/1993 | Sugiura | 358/434 X |
| 5,392,133 | 2/1995 | Nakajima | 358/407 |
| 5,438,436 | 8/1995 | Harris | 358/524 X |

Primary Examiner—Stuart N. Hecker
Assistant Examiner—K. Shin
Attorney, Agent, or Firm—Fitzpatrick, Cella, Harper & Scinto

[57] ABSTRACT

An image processing apparatus is disclosed which is arranged to incorporate a monochrome printer and have a color printer, which is connected thereto through an external interface, wherein a color/monochrome discriminating circuit discriminates whether color images are included in image information to be printed, and the image information to be printed is supplied to the color printer when color images are included and to the monochrome printer when color images are not included.

23 Claims, 7 Drawing Sheets

ALL PAGES WERE OUTPUT TO COLOR PRINTER 34 FROM AMONG 9 PAGES

PAGES 4 TO 7 WERE OUTPUT TO MONOCHROME PRINTER 28

PAGES 8 TO 10 WERE OUTPUT TO COLOR PRINTER 134

ALL PAGES WERE
OUTPUT TO COLOR
PRINTER 34 FROM
AMONG 9 PAGES

FIG. 8

PAGES 4 TO 7
WERE OUTPUT
TO MONOCHROME
PRINTER 28

FIG. 9

PAGES 8 TO 10
WERE OUTPUT
TO COLOR
PRINTER 134

IMAGE PROCESSING APPARATUS

BACKGROUND OF THE INVENTION

1. Field of the Invention

The present invention relates to an image processing apparatus and, more particularly, an image processing apparatus capable of discretely printing image information which simultaneously contains color image information and monochromatic image information by a monochrome printer and a color printer.

2. Related Background Art

Facsimile systems for transmitting monochromatic images through communications lines are known and color facsimile apparatuses capable of transmitting and receiving color images through similar communications lines have been proposed. Generally, these color facsimile apparatuses are respectively provided with a monochromatic image transmitting function conforming to the G3 or G4 specifications to ensure compatible connection with monochromatic facsimile apparatuses made according to the related art.

A facsimile apparatus is usually provided with a printer for printing out received images. A color facsimile apparatus is, of course, provided with a color printer. In other words, the color facsimile apparatus according to the related art is adapted to print out the received images, whether monochromatic or colored, by the color printer provided.

However, printing costs of general color printers are extremely expensive and printout operation requires a lot of time as well. Even if all received images are monochromatic or a monochromatic page and a color page are mixed in a received image, the conventional color facsimile apparatuses require expensive costs and a lot of time in printing out the images.

There has been a similar problem in a printing apparatus for printing out image information which simultaneously contains a monochromatic image and a color image, except for the color facsimile apparatuses.

SUMMARY OF THE INVENTION

An object of the present invention is to provide an image processing apparatus capable of solving the above-described problem.

Another object of the present invention is to provide an image processing apparatus capable of reducing a frequency of operation of a color printer and reducing costs therefor.

A further another object of the present invention is to provide an image processing apparatus capable of appropriately using a color printer and a monochrome printer.

A further another object of the present invention is to provide an image processing apparatus capable of ensuring high efficiency in appropriate applications of a color printer and a monochromatic printer.

A further another object of the present invention is to provide an image processing apparatus suited for color facsimile apparatuses.

A preferred embodiment of the present invention with the above-described objects discloses an image processing apparatus for printing out image information which may simultaneously contain a color image and a monochromatic image, comprising a monochrome printer, color printer, a color/monochrome discriminating means for discriminating a color image and a monochromatic image contained in a series of image information to be printed out, and supply control means for supplying all of a series of image information, that is, a sheet of full document to the color printer when even one color image is contained in the series of image information and to the monochrome printer when a color image is not contained, in accordance with the results of discrimination by the color/monochrome discriminating means.

Another preferred embodiment of the present invention discloses an image processing apparatus for printing out image information which may simultaneously contain a color image and a monochromatic image, comprising a monochrome printer, a color printer, a color/monochrome discriminating means for determining per page whether a color page is contained in a series of image information to be printed out, and supply control means for supplying the image information which contains a color page to the color printer and the image information which does not contain a color page to the monochrome printer in accordance with the results of discrimination by the color/monochrome discriminating means.

Other objects and features of the present invention are known from the other embodiments and accompanying drawings described in the following sheets.

DESCRIPTION OF THE PREFERRED EMBODIMENTS

Figure 1:
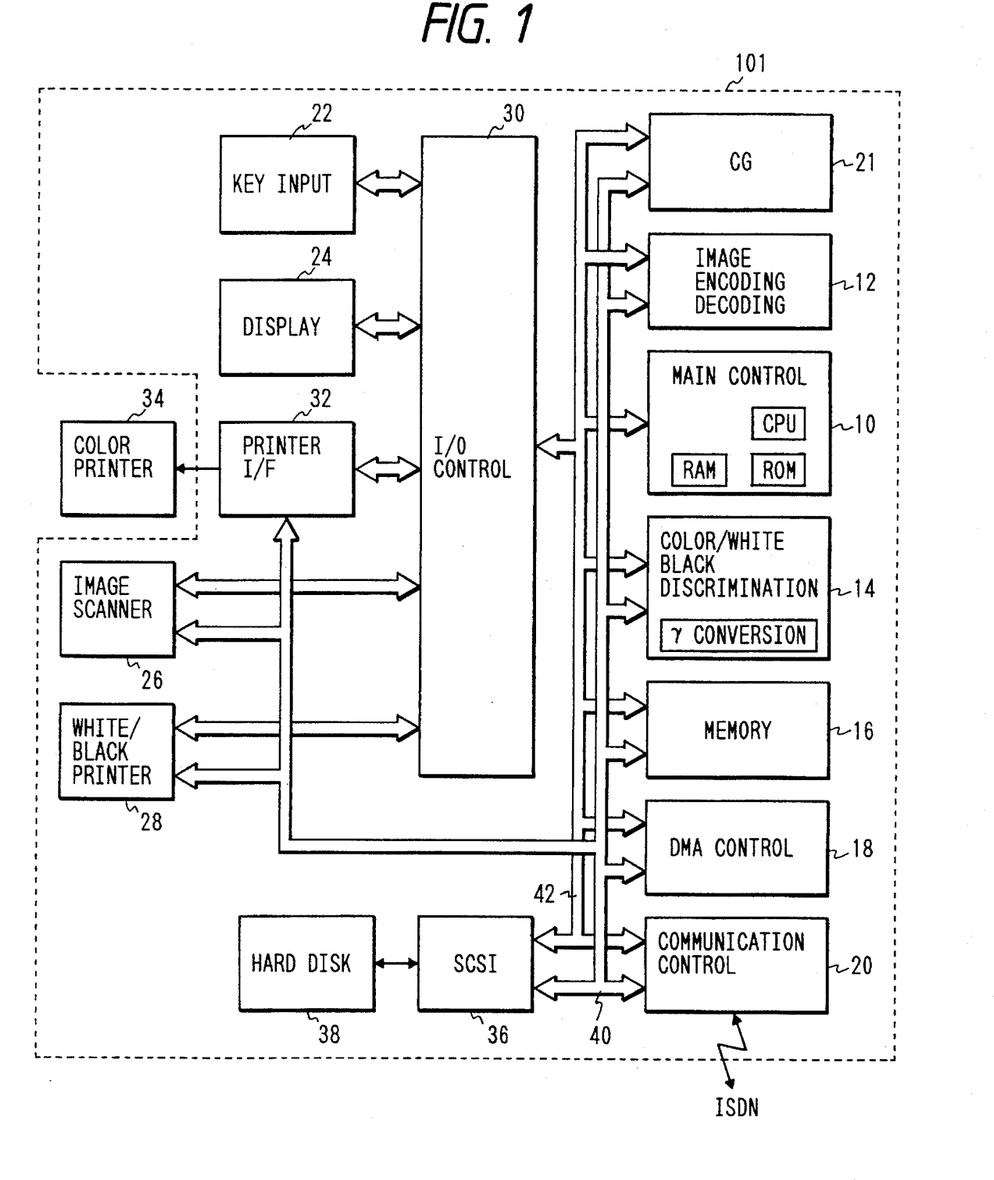
FIG. 1 is a schematic configuration block diagram of an embodiment of the present invention.

Preferred embodiments of the present invention are described, referring to the accompanying drawings thereof:

Referring to FIG. 1, there is shown a schematic configuration block diagram of an embodiment of the present invention applied to a color facsimile apparatus. In FIG. 1, 10 is a main control circuit which controls the overall apparatus and comprises a micro computer provided with a CPU, a ROM and a RAM. 12 is an image encoding/decoding circuit which encodes an image to be transmitted and decodes received encoded image signals and 14 is a color/monochrome discriminating circuit which determines whether a color image is contained in a page of image data page received and is provided with a y conversion circuit for converting image data from the RGB system to the CMYK system. The color/monochrome discriminating circuit 14 is also provided with a conversion function for converting a continuous-tone image to a binary image. The color/monochrome discriminating circuit 14 determines whether a color image is contained in each page of received image data from a header (which indicates that the received image data is monochromatic or colored) following each page of the received image data.

16 is a memory which stores image data and other data to be transmitted and received and 18 is a DMA control circuit for transmitting the data stored in the memory 16 and other memories without through the main control circuit 10. 20 is a communications control circuit for controlling the communications through the communication line such as, for example, an ISDN network. 21 is a character generator which generates character patterns to be printed on various reports, page header and page margins.

22 is a key input device (for example, one-touch keys, ten keys, start button, stop button, etc.) for entering various instructions by a user, 24 is a display for displaying various information such as out-of-paper, out-of-ink and actualities of communications, 26 is an image scanner for reading an original as an image, and 28 is a monochrome printer for printing out received images and reports of communication status. These devices are directly controlled by an I/O control circuit 30. A color printer 34 is connected to the I/O control circuit 30 through an interface 32 of the color printer.

36 is a known SCSI interface and 38 is a hard disk which temporarily stores received image data.

40 is an image data bus dedicated for image data which connects one another the circuits 10, 12, 14, 16, 18, 20, 21, 26, 28 and 32 and 42 is a control bus for controlling the system which connects one another the circuits 10 to 21, 30 and 36.

Figure 3:
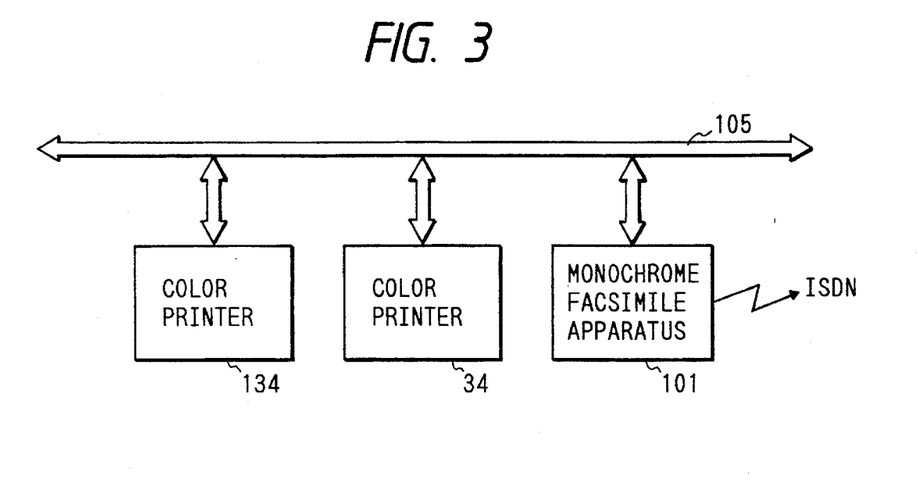
FIG. 3 is a block diagram showing a modification of FIG. 1.
Figure 4:
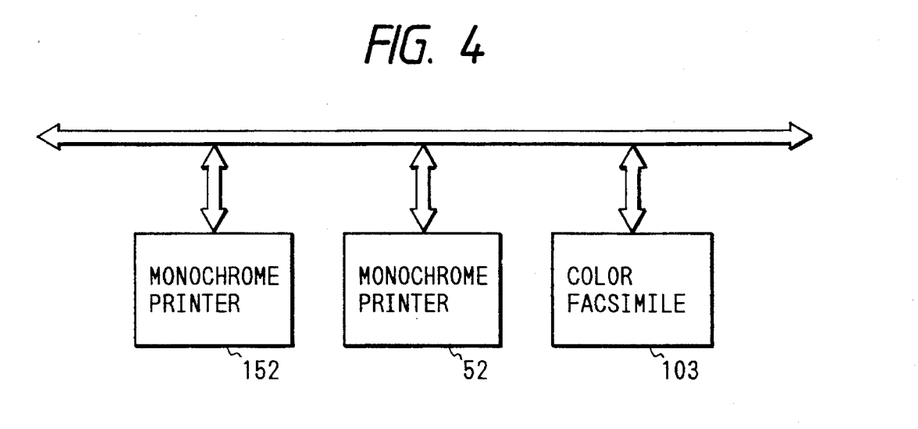
FIG. 4 is a block diagram showing a modification of FIG. 2.

In this embodiment, as shown in FIG. 3, a facsimile apparatus 101 shown with a broken line in FIG. 1 can be connected with the color printer 34.

Figure 5:
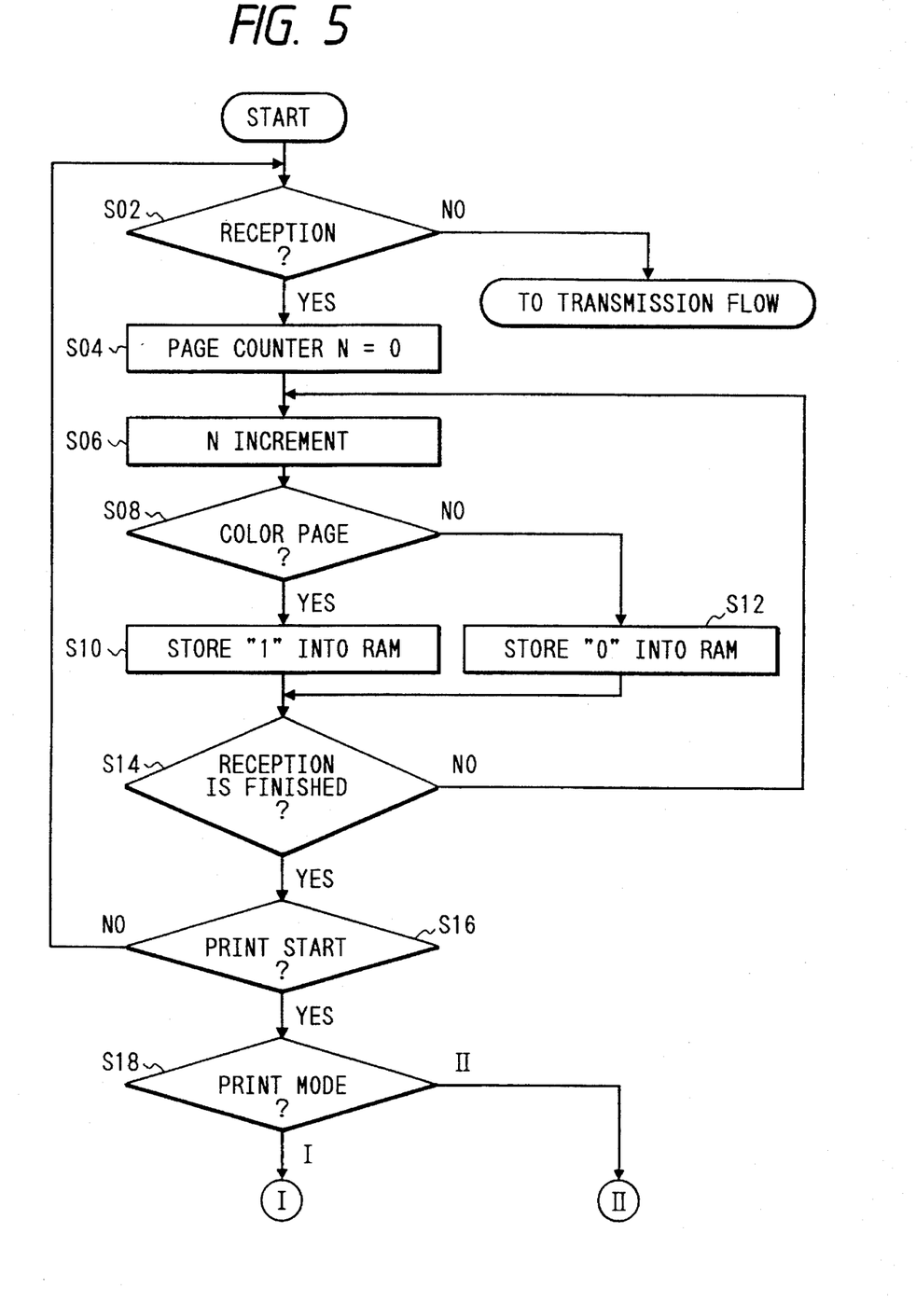
FIG. 5 is a flow chart illustrating the operation of the embodiment shown in FIG. 3.
Figure 6:
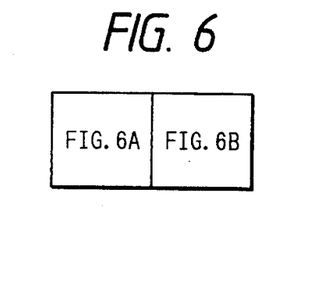
FIG. 6 is comprised of FIGS. 6A and 6B illustrating a flow chart of the operation of the embodiment shown in FIG. 3.
Figure 6A:
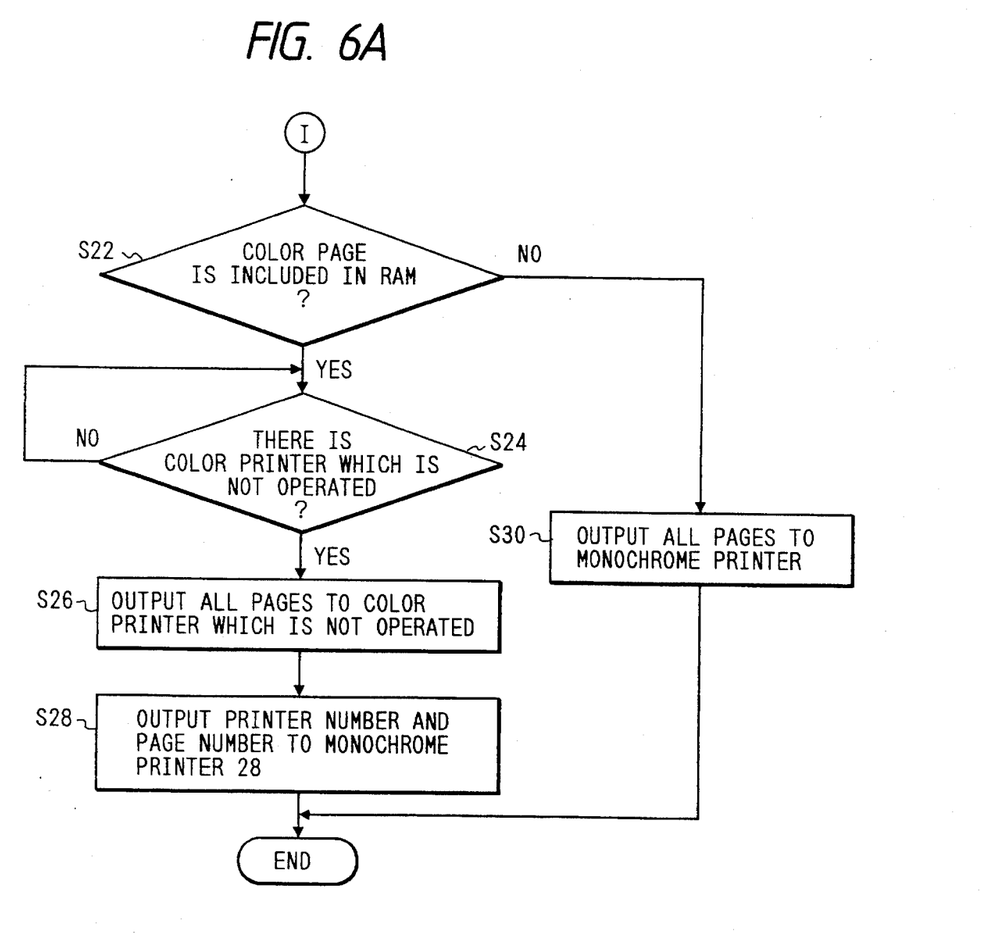
Figure 6B:
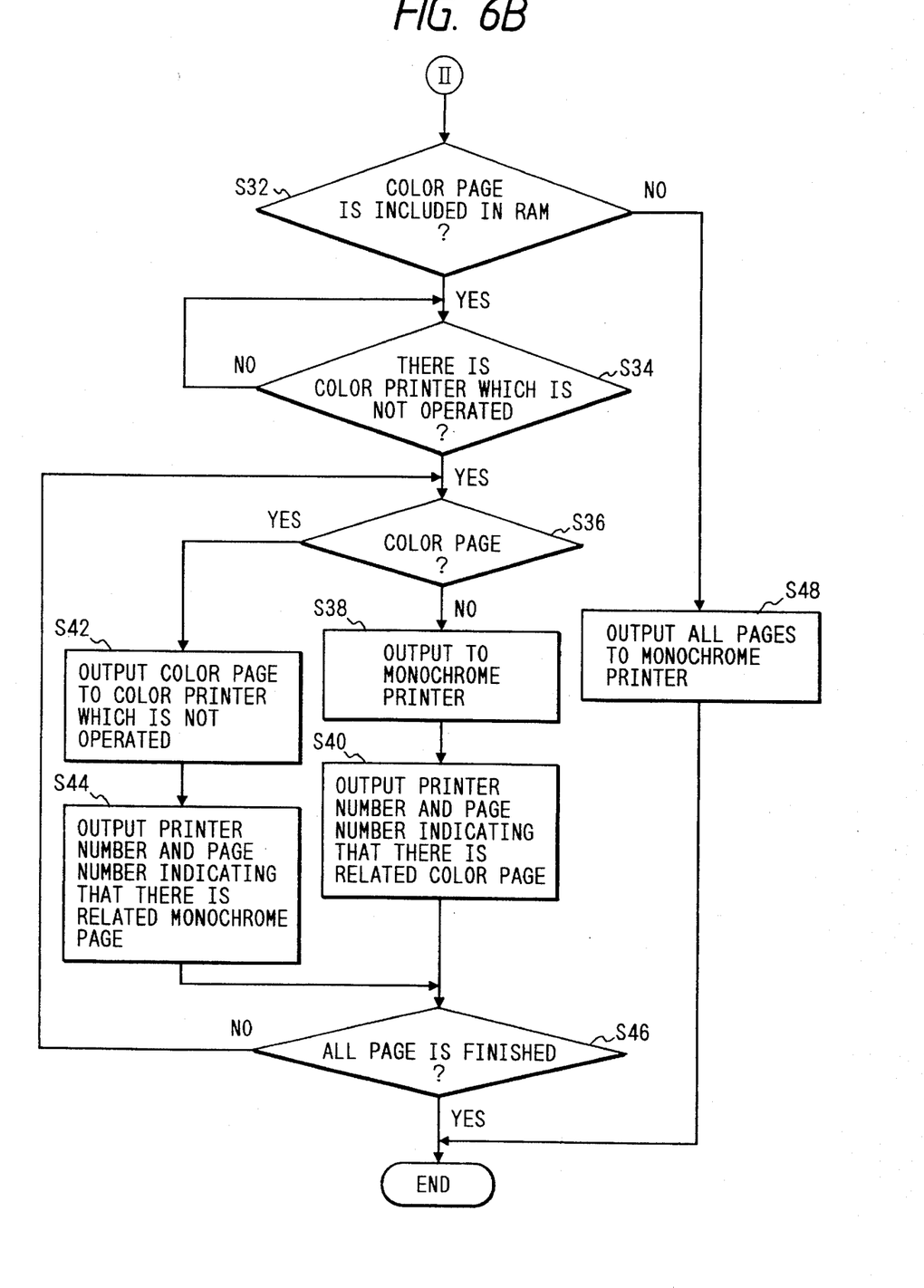

The operation of the above-described embodiment is described, referring to the flow charts shown in Figs. 5, 6A and 6B. In receiving operation, received data is temporarily stored in the memory 16 or the hard disk 38 (S02). For such reception, the page counter is reset temporarily (S04). The image encoding/decoding circuit 12 decodes the data stored and the color/monochrome discrimination circuit 14 carries out color/monochrome discrimination per page of received document data (S08). In case of the color page, the image data is converted from RGB data to CMYK data. In addition, the image data can be stored in the hard disk 38 after such conversion. In response to the result of discrimination in S08, "1" or "0" is stored in the address N in the RAM shown in FIG. 1 (S10, S12). These steps S04 to S12 are repeated until the reception is finished. Though the processing by the color/monochrome discrimination circuit 14 is usually executed at the time of reception, it can be executed at the time of printing. Functions and interactions of other circuits are not specific and therefore the detailed descriptions thereof are omitted.

In this embodiment, for printing received data (S16), those processing methods (I) and (II) for received data as described below can be selected according to a control program of the main control circuit 10 (S18). In the first processing method (I), prior execution of printing, whether a color image page is included or a color image is contained in one page in one reception, that is, one document from the data stored in the RAM is discriminated based on the result of discrimination by the color/monochrome discrimination circuit 14 (S22). If a small bit of color image is contained in one document, the image data of one document to be printed is supplied to the color printer 34 through the printer interface 32 (S26). If the color image is not contained, the image data to be printed is supplied to the monochrome printer 28 (S30).

Figure 7:
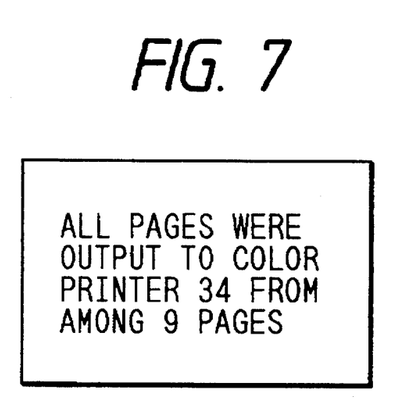
FIG. 7 is an output example to S28 in the flow chart of FIG. 5.

In this embodiment, besides supplying of image data of one document to be printed to the color printer 34, an idle color printer on the network 105 except for the color printer 34 is searched (S26) as shown in FIG. 3 and the data of all pages is to be outputted. Moreover, in this embodiment, for carrying out the control to output color images to the color printer 34 or the other color printer, the data which indicates that such control has been carried out is outputted to the monochrome printer (S28). An example of such printout is shown in FIG. 7. This enables to make the user aware that the control has been executed.

Only received images which require a color printing function are printed in colors and other images are printed in a monochromatic tone and therefore the printing time and costs can be saved by this processing method.

In the second processing method (II), image data to be printed of a page which contains a color image (referred to as the color page) is supplied to the color printer 34 through the printer interface 32. The image data to be printed of a page which does not contain the color image is supplied to the monochrome printer 28.

In this second processing method, part of a page included in one reception, that is, one received document is generally printed by the color printer 34 and the remaining part is printed by the monochrome printer 28. In this embodiment, therefore, the user is informed that the following pages are assigned to other printers 28 and 34.

In this second processing method, a message indicating that image data is to be printed out by the color printer 34 on the following page or the current page is printed on a monochrome page followed by a page including a color image, or a margin of the last one of monochrome pages or the following printing form. Otherwise, a message indicating that image data is to be printed by the monochrome printer 34 on the following page or the current page is printed on a page followed by a page which does not include a color image, that is, a color page followed by a monochrome page, or a margin of the last page or the following printing form. These messages are generated by the character generator 21 under the control by the min control circuit 10.

It is discriminated whether a color page is contained in one document received from data stored in the RAM included in the main control circuit 10 (S32) and, if the full page is monochromatic, the whole page is outputted to the monochrome printer according to the above discrimination (S48). On the other hand, if a color page is contained in one document, it is discriminated whether there is an idle color printer which is not printing in the network 105 (S34). This discrimination is carried out when the main control circuit 10 determines (discriminates) whether or not the printers on the network 105 are printing through the printer interface 32.

Figure 8:
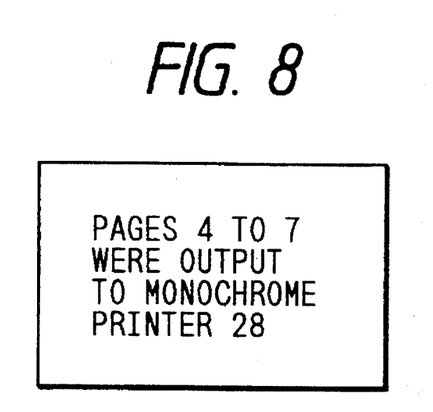
FIG. 8 is an output example to S44 in the flow chart of FIG. 6B.

If a color printer which is not printing is found, it is discriminated whether a page to be printed out is a color page (S36) and the page which has been discriminated as a color page is outputted by a printer which has been discriminated idle in step S34 (S42). In addition, the number of a related monochrome printer, that is, a specific number of the monochrome printer 28 and the number of pages which have been printed in a monochromatic tone in this embodiment are outputted by the color printer 34 to make the user aware that there is a related monochrome print in color printing. An example of such printout is shown in FIG. 8. On the other hand, if it is discriminated that a page to be printed in step S36 is not a color page or is a monochrome page, the page discriminated as described above is outputted by the monochrome printer 28 (S38). Information indicating that there is a related color page and the number of the printer which has carried out color printing are printed out by the monochrome printer 28 to make the user aware that there are related color pages. An example of such printout is shown in FIG. 9.

Whether all pages of one document are printed out (S46) and, if all pages are not printed out, the operation returns to step S36.

Figure 9:
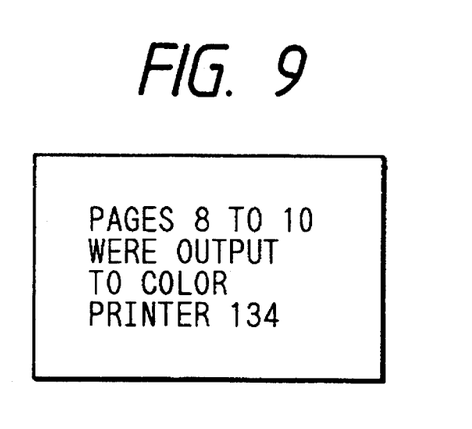
FIG. 9 is an output example to S42 in the flow chart of FIG. 6B.

According to this embodiment, messages shown in FIGS. 7 to 9 are visually outputted and therefore the user can discriminate which printer has been used to print out the document and operation efficiency is improved.

Figure 2:
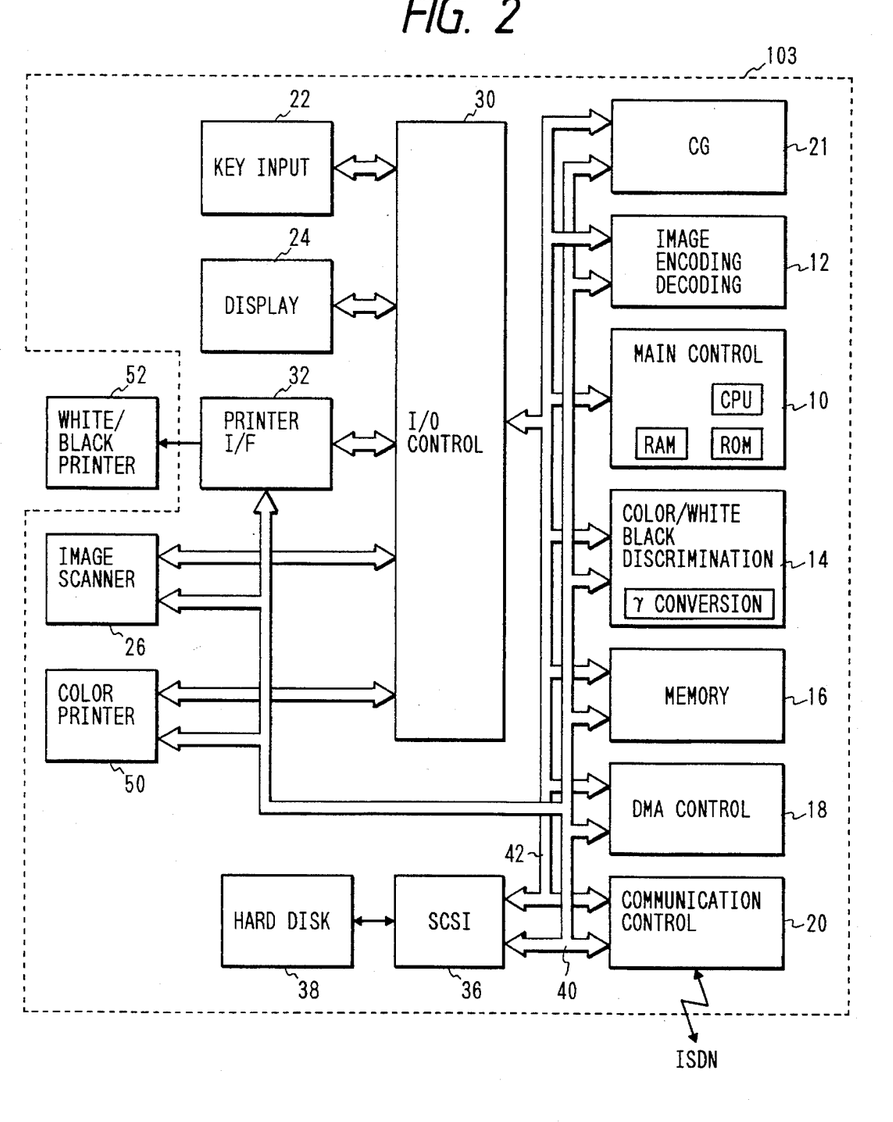
FIG. 2 is a schematic configuration block diagram of an amended embodiment of the present invention.

Though the monochrome printer is built in the apparatus and the color printer is externally connected in FIG. 1, the color printer can be built in the apparatus and the monochrome printer can be externally 10 connected. The block diagram of this configuration is shown in FIG. 2. The color printer is directly controlled by the I/O control circuit 30 and the monochrome printer 52 is connected to the printer interface 32.

For the control in such case, the color printer can be replaced with the monochrome printer in FIGS. 5 and 9.

The color facsimile apparatus is described in the above. However, it is clear that the present invention can apply to general apparatuses for printing out images which simultaneously contain monochrome images and color images.

As easily known from the above description, this embodiment enables to inexpensively print out those images which simultaneously contain monochromatic images and color images in a short period of time.

This embodiment can be variously modified within the range of claims shown in the following sheets.

What is claimed is:

1. An image processing apparatus comprising:
   a monochromatic printer for monochromatically printing received images;
   a color printer which is separately provided from said monochrome printer and which prints color images of received images;
   discriminating means for discriminating whether a color image is included in a document including a plurality of received images;
   output means for outputting said received image data to a color printer according to a discrimination result of said discriminating means, said output means outputting a color page of said received images to said color printer and a monochrome page to said monochrome printer; and
   means for notifying an output condition of said output means to an operator, wherein the output condition includes at least information relating to which printer a page.

2. An image processing apparatus according to claim 1, wherein said color printer is connected through an externally-connected interface.

3. An image processing apparatus according to claim 1, wherein said monochrome printer is connected through an externally-connected interface.

4. An image processing apparatus according to claim 1, wherein said output means outputs said image data to said color printer if said discriminating means discriminates that at least part of a color image is included in said received images.

5. An image processing apparatus according to claim 1, further comprising receiving means for receiving said received images through a line.

6. An image processing apparatus according to claim 5, wherein said line is an ISDN network.

7. An image processing apparatus comprising:
   a monochromatic printer for monochromatically printing received images;
   a color printer which is separately provided from said monochrome printer;
   output means which outputs said received images by selecting one of said monochrome printer or color printer; and
   visible output means which visibly outputs a state of a printer selected by said output means, wherein said visible output means notifies an operator as to which of said monochrome or color printer is outputting or has output a page.

8. An image processing apparatus according to claim 7, wherein said visible output means outputs reconciliation data through a printer other than the printer selected for outputting the images by said output means.

9. An image processing apparatus according to claim 7, wherein said state of print output means a number of pages which are printed by a printer selected for output by said output means.

10. An image processing apparatus according to claim 7, wherein said color printer is connected through an externally-connected interface.

11. An image processing apparatus according to claim 7, wherein said monochrome printer is connected through an externally-connected interface.

12. An image processing apparatus according to claim 8, further comprising discriminating means for discriminating whether said received image includes a color image.

13. An image processing apparatus according to claim 12, wherein said output means selects one of said monochrome printer or said color printer according to a result of a discrimination result of said discriminating means.

14. An image processing apparatus according to claim 13, wherein said output means outputs said image data to said color printer if said discriminating means discriminates that at least part of a color image is included in said received images.

15. An image processing apparatus according to claim 13, wherein said output means outputs a color page of said received images to said color printer and a monochrome page to said monochrome printer.

16. An image processing apparatus according to claim 7, further comprising receiving means for receiving said received images through a line.

17. An image processing apparatus according to claim 16, wherein said line is an ISDN network.

18. An image processing apparatus comprising:
    a monochromatic printer for monochromatically printing received images;
    a color printer which is separately provided from said monochromatic printer;
    control means capable of changing over a first mode for selecting said monochrome printer or said color printer for each page of a document including a plurality of received image planes and outputting it, and a second mode for selecting said monochrome printer or said color printer for each of documents including said plurality of image planes and outputting it; and means for notifying controlling operation of said control means to an operator, wherein the means for notifying also notifies the operator as to which printer is outputting or has output a page.

19. An image processing apparatus according to claim 18, wherein said color printer is connected through an externally-connected interface.

20. An image processing apparatus according to claim 18, wherein said monochrome printer is connected through an externally-connected interface.

21. An image processing apparatus according to claim 1, wherein said means for notifying notifies the output condition to the operator on a recording medium.

22. An image processing apparatus according to claim 7, wherein said visible output means notifies the operator on a recording medium.

23. An image processing apparatus according to claim 18, wherein said means for notifying notifies the operator on a recording medium.

* * * * *

UNITED STATES PATENT AND TRADEMARK OFFICE
CERTIFICATE OF CORRECTION

PATENT NO. : 5,604,598

DATED : February 18, 1997

INVENTOR : Yoshihiro Shigemura

It is certified that error appears in the above-identified patent and that said Letters Patent is hereby corrected as shown below:

COLUMN 1

Line 50, "another" should be deleted;
Line 53, "another" should be deleted; and
Line 57, "another" should be deleted.

COLUMN 2

Line 64, "y" should read --$\gamma$--.

COLUMN 3

Line 31, "one another" should be deleted; and
Line 32, after "36", please insert --to one another--.

UNITED STATES PATENT AND TRADEMARK OFFICE
CERTIFICATE OF CORRECTION

PATENT NO. : 5,604,598

DATED : February 18, 1997

INVENTOR : Yoshihiro Shigemura

It is certified that error appears in the above-identified patent and that said Letters Patent is hereby corrected as shown below:

COLUMN 5

Line 21, "10" should be deleted; and
Lines 58-59, "printer a" should read -- printer is outputting or has output a---.

COLUMN 6

Line 36, "claim 8," should read --claim 7,--.

Signed and Sealed this

Eighteenth Day of November 1997

Attest:

BRUCE LEHMAN

Attesting Officer

Commissioner of Patents and Trademarks